(12) United States Patent
Zhou et al.

(10) Patent No.: US 12,013,505 B2
(45) Date of Patent: Jun. 18, 2024

(54) AUTOMATIC SAMPLE-CHANGING DEVICE AND METHOD FOR PARTICLE BEAM RADIATION SAMPLES

(71) Applicant: INSTITUTE OF MODERN PHYSICS, CHINESE ACADEMY OF SCIENCES, Lanzhou (CN)

(72) Inventors: Libin Zhou, Lanzhou (CN); Ruishi Mao, Lanzhou (CN); Xin Li, Lanzhou (CN); Zhiguo Xu, Lanzhou (CN); Yan Du, Lanzhou (CN); Yucong Chen, Lanzhou (CN); Wenjian Li, Lanzhou (CN); Xincai Kang, Lanzhou (CN); Wenjie Jin, Lanzhou (CN); Zulong Zhao, Lanzhou (CN); Kun Wei, Lanzhou (CN)

(73) Assignee: INSTITUTE OF MODERN PHYSICS, CHINESE ACADEMY OF SCIENCES, Lanzhou (CN)

( * ) Notice: Subject to any disclaimer, the term of this patent is extended or adjusted under 35 U.S.C. 154(b) by 358 days.

(21) Appl. No.: 17/436,191

(22) PCT Filed: Mar. 13, 2020

(86) PCT No.: PCT/CN2020/079125
§ 371 (c)(1),
(2) Date: Sep. 24, 2021

(87) PCT Pub. No.: WO2020/177770
PCT Pub. Date: Sep. 10, 2020

(65) Prior Publication Data
US 2022/0179110 A1    Jun. 9, 2022

(30) Foreign Application Priority Data
Mar. 7, 2019   (CN) .......................... 201910171417.7

(51) Int. Cl.
*G01T 7/08*   (2006.01)
*G01T 1/29*   (2006.01)

(52) U.S. Cl.
CPC .............. *G01T 7/08* (2013.01); *G01T 1/2914* (2013.01)

(58) Field of Classification Search
CPC ............................... G01T 7/08; G01T 1/2914
See application file for complete search history.

(56) References Cited

U.S. PATENT DOCUMENTS

2005/0045821 A1*   3/2005   Noji .................. G01N 23/2204
250/311

FOREIGN PATENT DOCUMENTS

| CN | 105548220 A | 5/2016 |
| CN | 106178967 A | 12/2016 |

(Continued)

OTHER PUBLICATIONS

First Office Action issued in corresponding Chinese Application No. 201910171417.7; dated Apr. 23, 2021; 19 pgs.

(Continued)

*Primary Examiner* — Hugh Maupin
(74) *Attorney, Agent, or Firm* — HAUPTMAN HAM, LLP

(57) ABSTRACT

A device includes sample tray units, a sample tray transporting unit, a sample tray handling unit, and a sample tray radiation stage unit. The sample tray units are configured to load samples. The sample tray transporting unit is configured to carry a sample tray unit to a radiation room. The sample tray handling unit is between the sample tray transporting unit and the sample tray radiation stage unit, and is configured to transfer the sample tray unit on the sample tray transporting unit to the sample tray radiation stage unit or return the sample tray unit on the sample tray radiation stage (Continued)

unit to the sample tray transporting unit. The sample tray radiation stage unit is configured to carry the sample tray unit and move the samples to be irradiated in the sample tray unit to a particle beam radiation area to receive radiation.

10 Claims, 1 Drawing Sheet

(56) References Cited

FOREIGN PATENT DOCUMENTS

| | | |
|---|---|---|
| CN | 107884807 A | 4/2018 |
| CN | 108593685 A | 9/2018 |
| CN | 109917446 A | 6/2019 |

OTHER PUBLICATIONS

International Search Report issued in corresponding International Application No. PCT/CN2020/079125; dated Jun. 8, 2020; China National Intellectual Administration, Beijing, China, 7 pgs.

Written Opinion issued in corresponding International Application No. PCT/CN2020/079125; dated Jun. 8, 2020, China National Intellectual Administration, Beijing, China, 7 pgs.

* cited by examiner

AUTOMATIC SAMPLE-CHANGING DEVICE AND METHOD FOR PARTICLE BEAM RADIATION SAMPLES

RELATED APPLICATIONS

The present application is a U.S. National Phase of International Application Number PCT/CN2020/079125 filed Mar. 13, 2020 and claims priority to Chinese Application Number 201910171417.7 filed Mar. 7, 2019.

FIELD OF THE INVENTION

The present disclosure relates to an automatic sample changing device and method, in particular to an automatic sample changing device and method for particle beam irradiation samples.

BACKGROUND OF THE INVENTION

With development of nuclear science and nuclear technology, applications of radiation in biology and material science have become increasingly widespread. In the aspect of biology, mutation breeding of plants and microorganisms can be carried out. Compared with conventional breeding, radiation mutation breeding has advantages, such as simplicity, safety, high mutation rate, and saving manpower and material resources, and it has become an effective approach for traits improvement and germ plasm innovation. In addition, radiation can also be employed in particle beam cancer therapy and space biology research to carry out tumor radiotherapy and ground simulation of manned spaceflight biological effect. Radiation can also applied to carry out research of radiated molecular modification of drug molecules, which is beneficial for development of new drug molecules. In the aspect of material science, researches can be carried out in many fields, such as material modification, radiation resistance, nanomaterial preparation, and radiation tolerance of semiconductor components.

Different from electromagnetic radiation, particle beam radiation has a mode of action that is considerably different from target substance, and has a characteristic of strong radiation effect. A particle beam contains leptons and hadrons. The leptons may be electrons or positrons, and the hadrons include protons, light ions (such as helium ions), and heavy ions (such as carbon ions, oxygen ions, neon ions, argon ions, and iron ions, etc.). An energy range of particle beams may be ranged from thousands of electron volts to millions of or even gigas of electron volts that is a quantity close to the speed of light. As one of emerging sources of physical mutagenesis, particle beams are playing an increasingly important role in radiation mutagenesis breeding. Compared with traditional photon radiation, such as y-rays and X-rays, particle beam radiation mutation breeding has characteristics of high mutation efficiency, wide mutation spectrum, and short stable period, and is thereby widely applied on development of new varieties/new bacterial strains and creation of germplasm resources further and further. In the field of tumor therapy, particle beams have a characteristic of high relative-biological effectiveness of target area. In a process of penetrating through or injecting into a compound, a particle beam has characteristics of energy deposition and mass deposition, which may cause atomic or molecular damage to enable structure rearrangement of some molecules and may further form new molecular groups to enable change of physical properties and chemical properties of the original material. Thus, particle beams have a wide range of usages in fundamental and application researches of materials science. Particle beams are generally obtained by devices, such as reactors and particle accelerators.

An existing rotary tray sample changing system has drawbacks of low throughput and low efficiency, thereby failing to meet increasing demands of domestic users. The rotary tray sample changing system provides few samples to be changed at one time, leading to more times of changing of samples so that a waste of beam time has been resulted because to sample changing of rotary trays. At the same time, a high-energy particle accelerator has a high operating cost, where one hour of operation costs tens of thousands of RMB. Therefore, it is extremely important to improve efficiency of sample changing and increase a throughput of sample changing. In order to make full use of a beam generated by the accelerator and reduce a waste of costly beam, sufficient attention should be paid to the sample changing system of radiation samples. Only significant improvement of sample changing efficiency and increase of sample throughput at once sample changing, can biological and material samples undergoing particle beam irradiation meet the need of industrialization.

SUMMARY OF THE INVENTION

In view of the above problems, an objective of the present disclosure is to provide an automatic sample changing device and method for particle beam radiation samples so as to enable automatic changing of sample trays to replace manual sample changing, avoid waiting for an environmental radiation dose in a radiation room to drop to a safety range, so that beam time of a particle beam can be saved, thereby improving an utilization efficiency of the beam.

In order to achieve these above, an embodiment of the present disclosure provides an automatic sample changing device for particle beam radiation samples, including sample tray units, a sample tray transporting unit, a sample tray handling unit, and a sample tray radiation stage unit, wherein the sample tray units are configured to load samples to be irradiated, and the sample tray transporting unit is configured to carry and deliver a sample tray unit to a radiation room; the sample tray handling unit is arranged between the sample tray transporting unit and the sample tray radiation stage unit, and is configured to transfer the sample tray unit on the sample tray transporting unit to the sample tray radiation stage unit or return the sample tray unit on the sample tray radiation stage unit back to the sample tray transporting unit; and the sample tray radiation stage unit is configured to carry the sample tray unit transferred by the sample tray handling unit and move the samples to be irradiated in the sample tray unit to a particle beam radiation area to receive radiation.

In the automatic sample changing device, preferably, the sample tray transporting unit includes: a cart mechanism, on which layer rack mechanisms arranged along in a height direction are provided for accommodating at least one layer of sample tray unit; a cart positioning mechanism, on which the cart mechanism is slidably arranged, wherein the cart mechanism is delivered and fixed in a designated position in the radiation room by the cart positioning mechanism; and a toggle clamp positioning mechanism, which is arranged onto the layer rack mechanisms and is configured to ensure that the sample tray unit do not slide during transportation.

In the automatic sample changing device, preferably, the sample tray handling unit includes: a robot mechanism, on which a sample tray grabbing bracket mechanism is provided for grabbing and transferring a layer rack mechanism or a sample tray unit on the sample tray radiation stage unit; and a robot height adjustment mechanism, which is arranged at a handling base along a direction of Z axis and connected with the robot mechanism, and is configured to adjust the height in the Z axis for the robot mechanism.

In the automatic sample changing device, preferably, the sample tray radiation stage unit includes: a Y axis moving mechanism, which is arranged on a radiation stage base and extends along a direction of Y axis; an X axis moving mechanism, which is slidably arranged on the Y axis moving mechanism and extends along a direction of X axis; a radiation stage support mechanism, a lower end of which is slidably arranged at the X axis moving mechanism, and a upper end of which is configured to carry the sample tray unit transferred by the robot mechanism; a radiation stage height adjustment mechanism, which is arranged on the radiation stage support mechanism, and is configured to adjust a distance between the upper end of the radiation stage support mechanism and a beam vacuum window.

In the automatic sample changing device, preferably, the sample tray units are provided with groove-type trays and scale-type trays for loading different types of samples to be irradiated.

In the automatic sample changing device, preferably, the number of samples to be irradiated that are accommodated in the sample tray unit is 1-24; the layer rack mechanisms on the cart mechanism accommodate 1-10 layers of sample tray units; the robot mechanism sets a moving speed according to phase state of the samples to be irradiated: a moving speed for solid samples is set to 50-120 mm/s, and a moving speed for liquid samples is set to 10-60 mm/s; a moving distance of the radiation stage support mechanism in the X axis direction is −200 mm to 500 mm, and a moving distance in the Y axis direction is −100 mm to 300 mm; a height adjustment range of the radiation stage height adjustment mechanism in the Z axis direction is −200 mm to 600 mm; and the sample tray radiation stage unit is equipped with a zero-point positioning function.

Provided is an automatic sample changing method for samples to be irradiated by particle beam irradiation, which uses the above automatic sample changing device, characterized in that the method includes steps of:

step 1, installing the sample tray radiation stage unit in front of the beam vacuum window;

step 2, placing the samples to be irradiated in the sample tray units, inserting the sample tray units into the layer rack mechanism of the cart mechanism layer by layer and fixing the sample tray units with the toggle clamp positioning mechanism, and pushing the cart mechanism onto the cart positioning mechanism to deliver and fix the cart mechanism at the designated position in the radiation room;

step 3, transferring, by the robot mechanism, a sample tray unit at a specific layer rack mechanism from the cart mechanism to the radiation stage support mechanism, and adjusting, by the radiation stage height adjustment mechanism according to particle energy and a range of a radiation, a distance between the beam vacuum window and the samples to be irradiated to enable the radiation in an optimum condition;

step 4, adjusting, by the X axis moving mechanism and the Y axis moving mechanism, a position of the radiation stage support mechanism so that all samples to be irradiated in the sample tray unit arranged on the radiation stage support mechanism move in sequence according to preset coordinates, and subjecting each of the samples to be irradiated to individual irradiation in sequence by a particle beam passing through the vacuum window and air layer;

step 5, after all samples to be irradiated in the sample tray unit are irradiated, returning, by the sample tray handling unit, the sample tray unit from the radiation stage support mechanism to a designated layer rack mechanism of the cart mechanism; and step 6, repeating steps 3 to 5 until irradiation of all the samples to be irradiated on the cart mechanism are completed, and pushing the cart mechanism out of the radiation room for a next round of sample changing.

According to the automatic sample changing method, preferably, the particle beam includes nuclear particles and/or charged particles with an energy range of 8-400 MeV/u.

In the automatic sample changing method, preferably, the sample to be irradiated is irradiated under an atmospheric condition.

According to the automatic sample changing method, preferably, the sample to be irradiated includes plant seeds, tissue cultured seedlings, tissue pieces, roots, stems, leaves, buds, pollen, algae, spores, microbial fluids, colonies, spores, mammalian adherence, suspension culture cells, small animals, compounds, metals or non-metals.

On basis of these above, the present disclosure has the following advantages: 1. the sample tray units, the sample tray transporting unit, the sample tray handling unit and the sample tray radiation stage unit of the present disclosure cooperate with each other to enable automatic sample changing of the samples to be irradiated, so that an throughput of sample changing is significantly increased, and a waste of beam caused by staff frequently entering and exiting the irradiation room to change samples is greatly reduced, beam time of the particle beam is saved, and efficient sample changing for radiation of the samples to be irradiated is realized. 2. It has been verified through many times practice that the present disclosure is applicable to the samples to be irradiated by particle beam radiation, which has advantages of a high throughput and an applicability of radiation under the atmosphere. An operator can implement radiation sample changing of hundreds of samples to be irradiated through entering and exiting the radiation room only once. Sample changing for hundreds of samples to be irradiated can be completed per hour, which is completely applicable to a high-efficiency radiation treatment of the samples to be irradiated by particle beams, so that efficiency of sample changing is greatly improved and a shortcoming of high cost of high-energy particle accelerators is overcome, promoting industrialization of the particle beam radiation of biology and material samples.

DETAILED DESCRIPTION OF THE EMBODIMENTS

Figure 1:
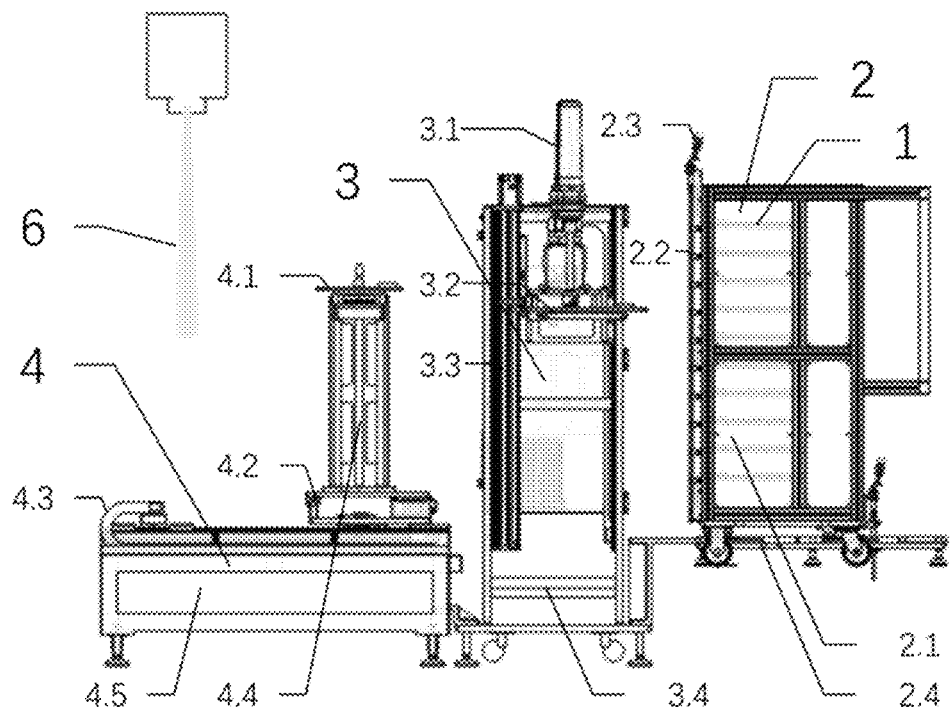
FIG. 1 is a schematic diagram of an overall structure of the present disclosure.

The preferred embodiments of the present disclosure will be described in detail below with reference to the accompanying drawings in order to understand the purpose, features and advantages of the present disclosure in a clear manner. It should be understood that the embodiments shown in the drawings do not intent to construct limitation to the scope of the present disclosure, but merely to illustrate the essential spirit of the technical solution of the present disclosure.

Figure 2:
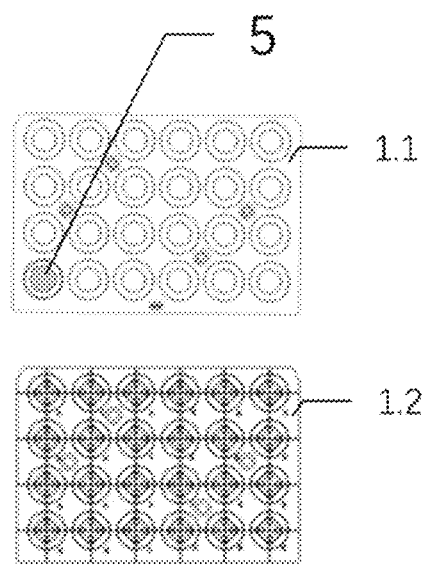
FIG. 2 is a schematic diagram of a structure of a sample tray unit of the present disclosure.

Embodiment 1: as shown in FIGS. 1 and 2, an automatic sample changing device for particle beam radiation samples provided by this embodiment includes a plurality of sample tray units 1, a sample tray transporting unit 2, a sample tray handling unit 3, and a sample tray radiation stage unit 4. The sample tray units 1 are configured to load samples 5 to be irradiated, and the sample tray transporting unit 2 is configured to carry and deliver a sample tray unit 1 to a radiation room. The sample tray handling unit 3 is arranged between the sample tray transporting unit 2 and the sample tray radiation stage unit 4, and is configured to transfer the sample tray unit 1 on the sample tray transporting unit 2 to the sample tray radiation stage unit 4 or return the sample tray unit 1 on the sample tray radiation stage unit 4 back to the sample tray transporting unit 2. The sample tray radiation stage unit 4 is configured to carry the sample tray unit 1 transferred by the sample tray handling unit 3 and move the samples 5 to be irradiated on the sample tray unit 1 to a particle beam radiation area 6 to receive radiation.

In this embodiment, preferably, the sample tray transporting unit 2 includes: a cart mechanism 2.1, on which a plurality of layer rack mechanisms 2.2 arranged along in a height direction are provided for accommodating at least one layer of sample tray unit 1; a cart positioning mechanism 2.4, on which the cart mechanism 2.1 is slidably arranged, wherein the cart mechanism 2.1 may be delivered and fixed at a designated position in the radiation room by the cart positioning mechanism 2.4; and a toggle clamp positioning mechanism 2.3, which is arranged onto the layer rack mechanisms 2.2 and is configured to ensure that the sample tray units 1 do not slide during transportation.

In this embodiment, preferably, the sample tray handling unit 3 includes: a robot mechanism 3.1, on which a sample tray grabbing bracket mechanism 3.2 is provided for grabbing and transferring a layer rack mechanism 2.2 or a sample tray unit 1 on the sample tray radiation stage unit 4; a robot height adjustment mechanism 3.3, which is arranged at a handling base 3.4 along a direction of Z axis and connected with the robot mechanism 3.1, and is configured to adjust a height in the Z axis for the robot mechanism 3.1.

In this embodiment, preferably, the sample tray radiation stage unit 4 includes: a Y axis moving mechanism 4.3, which is arranged at a radiation stage base 4.5 and extends along a direction of Y axis; an X axis moving mechanism 4.2, which is slidably arranged on the Y axis moving mechanism 4.3 and extends along a direction of X axis; a radiation stage support mechanism 4.1, a lower end of which is slidably arranged at the X axis moving mechanism 4.2, and a upper end of which is configured to carry a sample tray unit 1 transferred by the robot mechanism 3.1; a radiation stage height adjustment mechanism 4.4, which is arranged on the radiation stage support mechanism 4.1 and is configured to adjust a distance between the upper end of the radiation stage support mechanism 4.1 and a beam vacuum window.

In this embodiment, preferably, the sample tray units 1 are provided with groove-type trays 1.1 and scale-type trays 1.2 for loading varied types of samples 5 to be irradiated.

In this embodiment, preferably, grooves of a sample tray unit 1 may also be designed with its own size, shape or the like according to experimental requirements so as to be compatible with sample containers of various specifications, including petri dishes with a diameter of 30-60 mm, T12.5, T25 cell culture flasks, 0.2-50 mL centrifuge tubes, plant tissue culture flasks, and sample entities to be irradiated.

In this embodiment, preferably, the number of samples 5 to be irradiated that are accommodated in the sample tray unit 1 is 1-24.

In this embodiment, preferably, the layer rack mechanisms 2.2 on the cart mechanism 2.1 accommodate 1-10 layers of sample tray units 1, and a distance between layers of sample tray units 1 can be adjusted according to specific conditions. In this way, one single cart mechanism 2.1 can accommodate hundreds of samples 5 to be irradiated, and radiation sample changing of hundreds of samples 5 to be irradiated can be completed by a staff entering and exiting the radiation room once to push in and out one cart mechanism 2.1.

In this embodiment, preferably, the robot mechanism 3.1 may set a moving speed according to phase state of the samples 5 to be irradiated (such as solid samples or liquid samples). A moving speed for the solid samples is set to 50-120 mm/s, and a moving speed for the liquid samples is set to 10-60 mm/s so as to ensure that the samples will not pour or slosh during sample changing.

In this embodiment, preferably, a moving distance of the radiation stage support mechanism 4.1 in the X axis direction is −200 mm to 500 mm, and a moving distance in the Y axis direction is −100 mm to 300 mm, and movement may be carried out according to a preset coordinate so as to enable sequential irradiation of the samples; a height adjustment range of the radiation stage height adjustment mechanism 4.4 in the Z axis direction is −200 mm to 600 mm; at the same time, the sample tray radiation stage unit 4 is further equipped with a zero-point positioning function to enable beam monitoring and dose calibration.

Embodiment 2: provided is an automatic sample changing method for particle beam irradiation samples, including the following steps 1 to 6.

In step 1, the sample tray radiation stage unit 4 is installed in front of the beam vacuum window.

In step 2, samples to be irradiated, such as plant seeds, pollen, tissue pieces, microbial colonies and spores to be irradiated are placed into 24 petri dishes of 35 mm separately and then arranged together on one sample tray unit 1, 10 sample tray units 1 like this are inserted into the layer rack mechanisms 2.2 of the cart mechanism 2.1 layer by layer and fixed with the toggle clamp positioning mechanism 2.3, then, the cart mechanism 2.1 is pushed onto the cart positioning mechanism 2.4 to be delivered and fixed at a designated position in the radiation room.

In step 3, the robot mechanism 3.1 transfers, from the cart mechanism 2.1, a sample tray unit 1 at a specific layer rack mechanism 2.2 to the radiation stage support mechanism 4.1, where a selected moving speed is 100 mm/s; and the radiation stage support mechanism 4.1 adjusts, through the radiation stage height adjustment mechanism 4.4, a distance between the beam vacuum window and the samples 5 to be irradiated to 800 mm.

In step 4, a position of the radiation stage support mechanism 4.1 is adjusted through the X axis moving mechanism 4.2 and the Y axis moving mechanism 4.3 so that all the samples 5 to be irradiated on the sample tray unit 1 arranged on the radiation stage support mechanism 4.1 move in sequence according to preset coordinates, and each of the samples 5 to be irradiated undergoes individual irradiation in sequence through an adopted medium-energy carbon ion beam of 80 MeV/u passing through the beam vacuum window and air layer.

In step 5, after all the samples 5 to be irradiated on the sample tray unit 1 are irradiated, the sample tray unit 1 is returned from the radiation stage support mechanism 4.1 to a designated layer rack mechanism 2.2 of the cart mechanism 2.1 by the sample tray handling unit 3, where a selected moving speed is 100 mm/s.

In step 6, steps 3 to 5 are repeated until irradiation of all the samples 5 to be irradiated on the cart mechanism 2.1 are completed, and then the staff enters the radiation room and pushes the cart mechanism 2.1 out of the radiation room for the next round of sample changing.

Embodiment 3: provided is an automatic sample changing method for particle beam irradiation samples, including the following steps 1 to 6.

In step 1, the sample tray radiation stage unit 4 is installed in front of the beam vacuum window.

In step 2, samples to be irradiated, such as plant seeds, pollen, tissue pieces, microbial colonies and spores to be irradiated are placed into 12 petri dishes of 60 mm separately and then arranged together on one sample tray unit, 5 sample tray units 1 like this are inserted into the layer rack mechanisms 2.2 of the cart mechanism 2.1 layer by layer and fixed with the toggle clamp positioning mechanism 2.3, then, the cart mechanism 2.1 is pushed onto the cart positioning mechanism 2.4 to be delivered and fixed at a designated position in the radiation room.

In step 3, the robot mechanism 3.1 transfers, from the cart mechanism 2.1, a sample tray unit 1 at a specific layer rack mechanism 2.2 to the radiation stage support mechanism 4.1, where a selected moving speed is 100 mm/s; and the radiation stage support mechanism 4.1 adjusts, through the radiation stage height adjustment mechanism 4.4, a distance between the beam vacuum window and the samples 5 to be irradiated to 1000 mm.

In step 4, a position of the radiation stage support mechanism 4.1 is adjusted through the X axis moving mechanism 4.2 and the Y axis moving mechanism 4.3 so that all the samples 5 to be irradiated on the sample tray unit 1 arranged on the radiation stage support mechanism 4.1 move in sequence according to preset coordinates, and each of the samples 5 to be irradiated undergoes individual irradiation in sequence through an adopted high-energy argon ion beam of 50 MeV/u passing through the beam vacuum window and air layer.

In step 5, after all the samples 5 to be irradiated on the sample tray unit 1 are irradiated, the sample tray unit 1 is returned from the radiation stage support mechanism 4.1 to a designated layer rack mechanism 2.2 of the cart mechanism 2.1 by the sample tray handling unit 3, where a selected moving speed is 100 mm/s.

In step 6, steps 3 to 5 are repeated until irradiation of all the samples 5 to be irradiated on the cart mechanism 2.1 are completed, and then the staff enters the radiation room and pushes the cart mechanism 2.1 out of the radiation room for the next round of sample changing.

Embodiment 4: provided is an automatic sample changing method for particle beam irradiation samples, including the following steps 1 to 6.

In step 1, the sample tray radiation stage unit 4 is installed in front of the beam vacuum window.

In step 2, liquid samples 5 to be irradiated, such as mammalian adherent cells, suspension cells, plant algae liquid, microbial bacteria liquid to be irradiated are placed into 24 petri dishes of 35 mm separately and then arranged together on one sample tray unit, 10 sample tray units 1 like this are inserted into the layer rack mechanisms 2.2 of the cart mechanism 2.1 layer by layer and fixed with the toggle clamp positioning mechanism 2.3, then, the cart mechanism 2.1 is pushed onto the cart positioning mechanism 2.4 to be delivered and fixed at a designated position in the radiation room.

In step 3, the robot mechanism 3.1 transfers, from the cart mechanism 2.1, a sample tray unit 1 at a specific layer rack mechanism 2.2 to the radiation stage support mechanism 4.1, where a selected moving speed is 50 mm/s; and the radiation stage support mechanism 4.1 adjusts, through the radiation stage height adjustment mechanism 4.4, a distance between the beam vacuum window and the samples 5 to be irradiated to 800 mm.

In step 4, a position of the radiation stage support mechanism 4.1 is adjusted through the X axis moving mechanism 4.2 and the Y axis moving mechanism 4.3 so that all the samples 5 to be irradiated on the sample tray unit 1 arranged on the radiation stage support mechanism 4.1 move in sequence according to preset coordinates, and each of the samples 5 to be irradiated undergoes individual irradiation in sequence through an adopted medium-energy carbon ion beam of 80 MeV/u passing through the beam vacuum window and air layer.

In step 5, after all the samples 5 to be irradiated on the sample tray unit 1 are irradiated, the sample tray unit 1 is returned from the radiation stage support mechanism 4.1 to a designated layer rack mechanism 2.2 of the cart mechanism 2.1 by the sample tray handling unit 3, where a selected moving speed is 50 mm/s.

In step 6, steps 3 to 5 are repeated until irradiation of all the samples 5 to be irradiated on the cart mechanism 2.1 are completed, and then the staff enters the radiation room and pushes the cart mechanism 2.1 out of the radiation room for the next round of sample changing.

Embodiment 5: provided is an automatic sample changing method for particle beam irradiation samples, including the following steps 1 to 6.

In step 1, the sample tray radiation stage unit 4 is installed in front of the beam vacuum window.

In step 2, 12 samples 5 to be irradiated, such as plant tubers, rhizomes, branches, mice and rats to be irradiated are placed directly on a sample tray unit 1, respectively, 10 sample tray units 1 like this are inserted into the layer rack mechanisms 2.2 of the cart mechanism 2.1 layer by layer and fixed with the toggle clamp positioning mechanism 2.3, then, the cart mechanism 2.1 is pushed onto the cart positioning mechanism 2.4 to be delivered and fixed at a designated position in the radiation room.

In step 3, the robot mechanism 3.1 transfers, from the cart mechanism 2.1, a sample tray unit 1 at a specific layer rack mechanism 2.2 to the radiation stage support mechanism 4.1, where a selected moving speed is 100 mm/s; and the radiation stage support mechanism 4.1 adjusts, through the radiation stage height adjustment mechanism 4.4, a distance between the beam vacuum window and the samples 5 to be irradiated to 800 mm.

In step 4, a position of the radiation stage support mechanism 4.1 is adjusted through the X axis moving mechanism 4.2 and the Y axis moving mechanism 4.3 so that all the samples 5 to be irradiated on the sample tray unit 1 arranged on the radiation stage support mechanism 4.1 move in sequence according to preset coordinates, and each of the samples 5 to be irradiated undergoes individual irradiation in sequence through an adopted medium-energy carbon ion beam of 80 MeV/u passing through the beam vacuum window and air layer.

In step 5, after all the samples 5 to be irradiated on the sample tray unit 1 are irradiated, the sample tray unit 1 is returned from the radiation stage support mechanism 4.1 to a designated layer rack mechanism 2.2 of the cart mechanism 2.1 by the sample tray handling unit 3, where a selected moving speed is 100 mm/s.

In step 6, steps 3 to 5 are repeated until irradiation of all the samples 5 to be irradiated on the cart mechanism 2.1 are completed, and then the staff enters the radiation room and pushes the cart mechanism 2.1 out of the radiation room for the next round of sample changing.

Embodiment 6: provided is an automatic sample changing method for particle beam irradiation samples, including the following steps 1 to 6.

In step 1, the sample tray radiation stage unit 4 is installed in front of the beam vacuum window.

In step 2, 10 samples to be irradiated of powder pellets of epipodophyllotoxins are placed directly on a sample tray unit 1, 5 sample tray units 1 like this are inserted into the layer rack mechanism 2.2 of the cart mechanism 2.1 layer by layer and fixed with the toggle clamp positioning mechanism 2.3, then, the cart mechanism 2.1 is pushed onto the cart positioning mechanism 2.4 to be delivered and fixed at a designated position in the radiation room.

In step 3, the robot mechanism 3.1 transfers, from the cart mechanism 2.1, a sample tray unit 1 at a specific layer rack mechanism 2.2 to the radiation stage support mechanism 4.1, where a selected moving speed is 100 mm/s; and the radiation stage support mechanism 4.1 adjusts, through the radiation stage height adjustment mechanism 4.4, a distance between the beam vacuum window and the samples 5 to be irradiated to 800 mm.

In step 4, a position of the radiation stage support mechanism 4.1 is adjusted through the X axis moving mechanism 4.2 and the Y axis moving mechanism 4.3 so that all the samples 5 to be irradiated on the sample tray unit 1 arranged on the radiation stage support mechanism 4.1 move in sequence according to preset coordinates, and each of the samples 5 to be irradiated undergoes individual irradiation in sequence through an adopted medium-energy carbon ion beam of 80 MeV/u passing through the beam vacuum window and air layer.

In step 5, after all the samples 5 to be irradiated on the sample tray unit 1 are irradiated, the sample tray unit 1 is returned from the radiation stage support mechanism 4.1 to a designated layer rack mechanism 2.2 of the cart mechanism 2.1 by the sample tray handling unit 3, where a selected moving speed is 100 mm/s.

In step 6, steps 3 to 5 are repeated until irradiation of all the samples 5 to be irradiated on the cart mechanism 2.1 are completed, and then the staff enters the radiation room and pushes the cart mechanism 2.1 out of the radiation room for the next round of sample changing.

The foregoing embodiments are only used to illustrate the present disclosure, where a structure, a connection mode, and a manufacturing process of each component in these embodiments may be modified. Any equivalent transformation and improvement implemented based on the technical solution of the present disclosure should not be excluded out of the protection scope of the present disclosure.

What is claimed is:

1. An automatic sample changing device for particle beam radiation samples, comprising:
   a plurality of sample tray;
   a sample tray rack for holding the plurality of sample trays;
   a carriage supporting the sample tray rack for movement between a loading position outside a radiation room to a load/unload position within the radiation room;
   a sample tray loader positioned adjacent the sample tray rack load/unload position;
   a radiation stage; and
   a radiation source;
      wherein the sample trays are configured to hold samples to be irradiated, and the sample tray loader is configured to remove a selected sample tray of the plurality sample trays from the sample tray rack and position the selected sample tray on the radiation stage;
      wherein the radiation stage carries the selected sample tray between the sample tray rack load/unload position and a particle beam radiation area, thereby exposing the sample to particle beam radiation and obtaining an irradiated sample, and returns the selected sample tray containing the irradiated sample to the load/unload position;
   the sample tray loader is arranged between the sample tray rack load/unload position;
   wherein a quantity of samples to be irradiated that are accommodated in an individual sample tray is 1-24;
   the sample tray rack supported by the carriage accommodate 1-10 layers of sample trays;
   movement of the carriage, sample tray loader, and radiation stage is determined according to a phase state of the sample to be irradiated, wherein a first moving speed for solid samples is 50-120 mm/s, and a second moving speed for liquid samples is 10-60 mm/s;
   a moving distance of the radiation stage in the direction of X axis is −200 mm to 500 mm and a moving distance in the direction of Y axis is −100 mm to 300 mm;
   a height adjustment range of the radiation stage in the direction of Z axis is −200 mm to 600 mm; and
   the radiation stage is equipped with a zero-point positioning function.

2. The automatic sample changing device according to claim 1, wherein the sample tray transporting unit comprises:
   a cart mechanism, on which layer rack mechanisms arranged in a height direction are provided for accommodating at least one layer of sample tray unit;
   a cart positioning mechanism, on which the cart mechanism is slidably arranged, wherein the cart mechanism is delivered and fixed at a designated position in the radiation room by the cart positioning mechanism; and
   a toggle clamp positioning mechanism, which is arranged onto the layer rack mechanisms and is configured to ensure that the sample tray units do not slide during transportation.

3. The automatic sample changing device according to claim 2, wherein the sample tray handling unit comprises:
   a robot mechanism, on which a sample tray holding bracket mechanism is provided for grasping and transferring a layer rack mechanism or a sample tray unit on the sample tray radiation stage unit; and
   a robot height adjustment mechanism, which is arranged at a handling base along a direction of Z axis and is connected with the robot mechanism and is configured to adjust a height in the Z axis for the robot mechanism.

4. The automatic sample changing device according to claim 3, wherein the sample tray radiation stage unit comprises:
   a Y axis moving mechanism, which is arranged at a radiation stage base and extends along a direction of Y axis;

an X axis moving mechanism, which is slidably arranged on the Y axis moving mechanism and extends along a direction of X axis;

a radiation stage support mechanism, a lower end of which is slidably arranged on the X axis moving mechanism, and a upper end of which is configured to carry the sample tray unit transferred by the robot mechanism; and a radiation stage height adjustment mechanism, which is arranged on the radiation stage support mechanism and is configured to adjust a distance between the upper end of the radiation stage support mechanism and a beam vacuum window.

5. The automatic sample changing device according to claim 1, wherein the sample tray units are provided with groove-type trays and scale-type trays for loading the samples to be irradiated of different types.

6. An automatic sample changing method for particle beam irradiation samples, using the automatic sample changing device according to claim 4, wherein, the method comprises steps of:

step 1, installing the sample tray radiation stage unit in front of the beam vacuum window;

step 2, placing the samples to be irradiated on the sample tray units, inserting the sample tray units into the layer rack mechanisms of the cart mechanism layer by layer and fixing the sample tray units with the toggle clamp positioning mechanism, and pushing the cart mechanism onto the cart positioning mechanism to deliver and fix the cart mechanism at a designated position in the radiation room;

step 3, transferring, by the robot mechanism, a sample tray unit at a specific layer rack mechanisms from the cart mechanism to the radiation stage support mechanism, and adjusting, by the radiation stage height adjustment mechanism according to particle energy and a range of a radiation, a distance between the beam vacuum window and the samples to be irradiated to enable the radiation in an optimum condition;

step 4, adjusting, by the X axis moving mechanism and the Y axis moving mechanism, a position of the radiation stage support mechanism so that all samples to be irradiated in the sample tray unit arranged on the radiation stage support mechanism move in sequence according to preset coordinates, and subjecting each of the samples to be irradiated to individual irradiation in sequence by a particle beam passing through the vacuum window and air layer;

step 5, after all samples to be irradiated on the sample tray unit are irradiated, returning, by the sample tray handling unit, the sample tray unit from the radiation stage support mechanism to a designated layer rack mechanism of the cart mechanism; and step 6, repeating steps 3 to 5 until irradiation of all samples to be irradiated on the cart mechanism are completed and pushing the cart mechanism out of the radiation room for a next round of sample changing.

7. The automatic sample changing method according to claim 6, wherein the particle beam includes nuclear particles and/or charged particles with an energy range of 8-400 MeV/u.

8. The automatic sample changing method according to claim 6, wherein the sample to be irradiated is irradiated under an atmospheric condition.

9. The automatic sample changing method according to claim 6, wherein the sample to be irradiated includes plant seeds, tissue cultured seedlings, tissue pieces, roots, stems, leaves, buds, pollen, algae, spores, microbial fluids, colonies, spores, mammalian adherence, suspension culture cells, small animals, compounds, metals or non-metals.

10. An automatic sample changing system for particle beam radiation samples, comprising:

a plurality of sample trays for holding a sample for irradiation;

a sample tray rack for holding the plurality of sample trays;

a radiation stage for sequentially receiving sample trays from the sample tray rack and positioning the sample for irradiation;

a particle beam radiation source for irradiating the sample in the sample tray positioned on the radiation stage to obtain an irradiated sample;

a loader/unloader assembly positioned between the sample tray rack and the radiation stage, wherein the loader assembly is operable to sequentially remove one of the plurality of sample trays containing the sample for irradiation from the sample tray rack, position the sample tray on the radiation stage and, after irradiation of the sample, remove the sample tray containing the irradiated sample from the radiation stage, replace the sample tray in the sample tray rack, and repeat these operations for the remainder of the sample trays.

* * * * *